Patented Dec. 13, 1949

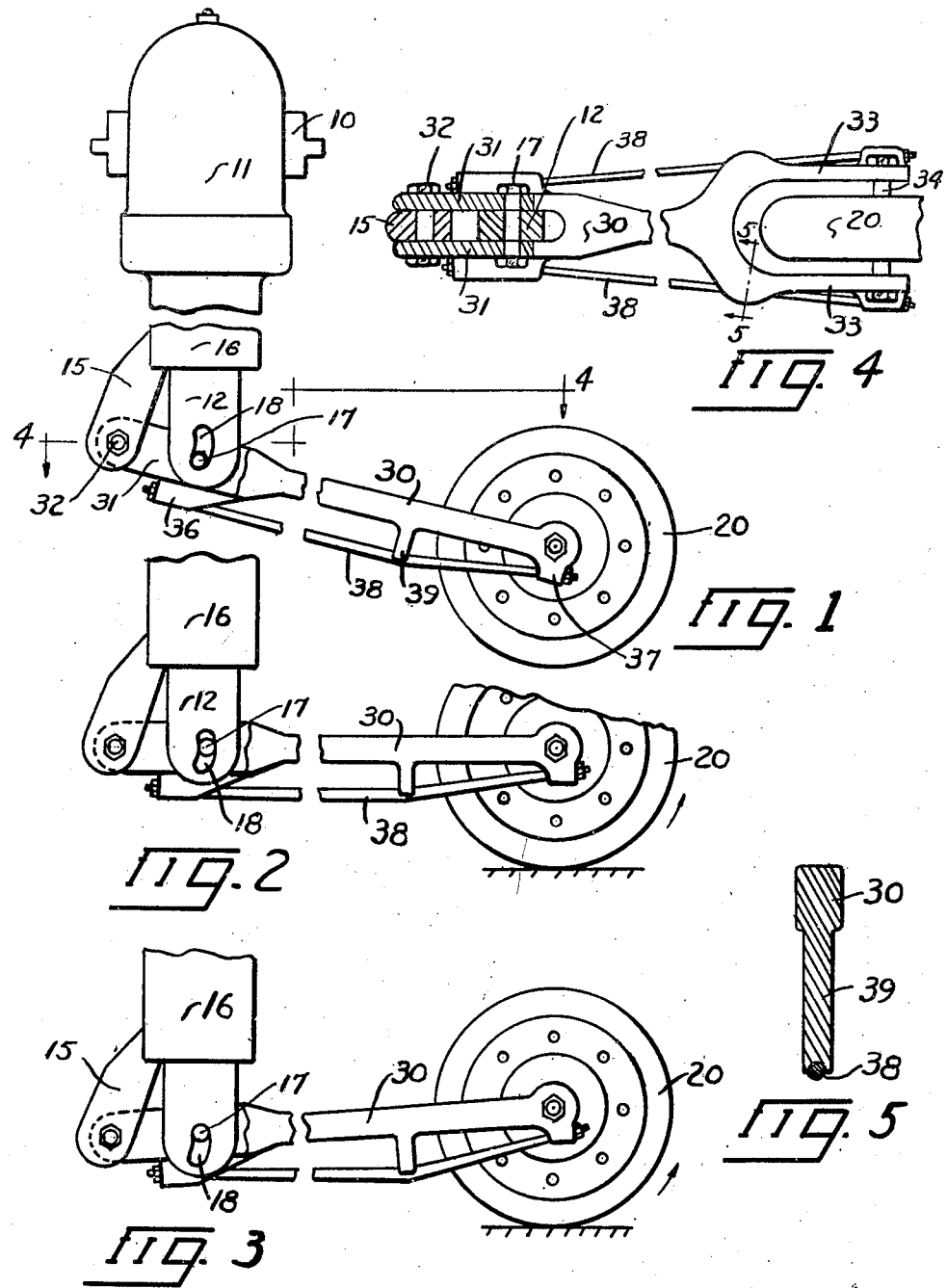

2,491,174

UNITED STATES PATENT OFFICE 2,491,174

AIRPLANE LANDING GEAR

Lucien R. Gruss, Middletown, Ohio

Application January 9, 1947, Serial No. 721,087

3 Claims. (Cl. 244—103)

This invention relates to a landing gear for airplanes and particularly to a shock absorbing landing gear having provision to start the landing wheels rotating before they receive the load of the airplane. The object of the invention is to provide a device having this characteristic in a very simple form which may be cheaply constructed and not be liable to get out of order notwithstanding the uses to which it may be subjected.

One form of my invention, showing one of the landing wheels associated with a shock absorbing device, is illustrated in the drawing hereof and is hereinafter more fully explained and the essential novel features of the invention are set out in the claims.

In the drawings, Fig. 1 is a side elevation partly broken away of a shock absorber equipped by this invention with a landing wheel, the parts being shown in the position they have during flight, it being understood that the other landing wheel with its shock absorber will be a duplicate of that shown; Fig. 2 is a fragmentary side elevation of the same parts as shown in Fig. 1, in the position they have when the landing wheel engages the ground but before the load of the airplane comes onto it; Fig. 3 is a similar view showing the same parts just as the airplane in settling brings its full load onto the landing wheel; Fig. 4 is a fragmentary plan on the offset plane indicated by the line 4—4 on Fig. 1; Fig. 5 is a vertical section to the truss carrying the landing wheel, in a plane indicated by the line 5—5 on Fig. 4.

In Figs. 1, 2 and 3, 10 indicates a suitable bracket adapted to be secured to an airplane, not shown. 11 indicates a cylinder carried by the bracket and 12 a plunger vertically reciprocable within the cylinder and opposed therein by suitable yielding resistance, as for instance fluid under pressure.

Suitable means is carried by the bracket 10 to provide a fulcrum for a trussed lever carrying the landing wheel. This support is shown as an arm 15 carried by a downward extension 16 of the cylinder which later is carried by the bracket 10.

The landing wheel 20 equipped with the usual pneumatic tire is rotatably carried by a forked trussed lever 30 pivoted to the arm 15. As shown the upper chord of the truss lever is an arm of considerable length bifurcated at its forward end, designated 31, to pass onto opposite sides of the arm 15 to which it is pivoted as by a bolt 32. The rear end of the arm 30 is also bifurcated as at 33 and carries an axle 34 on which are the bearings for the landing wheel 20.

The bifurcated forward arms 31 of the trussed lever are shown as having elongated tubular bosses 36 on their undersides, and likewise tubular bosses 37 are provided on the underside of the rear arms 33. Suitable tension rods 38 extend through the two sets of bosses and are held by nuts on the ends of the rods. Intermediately the rods pass under and engage downward extensions 39 of the arms 30. The construction described makes a very efficient trussed lever pivoting the wheel to the supporting bracket.

The plunger 12 of the shock absorber is pivotally connected with an intermediate region of the lever 30 by a loose-play connection. As shown, the lower end of the plunger 12 is flattened and passes through the forward fork 31 of the lever, and is connected to this lever by a bolt 17 carried by the lever and extending through an up-and-down slot 18 in the plunger. The slot is curved about the axis of the pivot bolt 32 as a center so that the bolt 17 may move up-and-down in the slot without throwing a lateral stress on the plunger.

In flight, the parts above described are in the position shown in Fig. 1 where the lever 30 inclines downwardly and is supported intermediate its ends by the plunger 12 which is in its lowermost position, the bolt 17 being then in the bottom of the slot 18. As the airplane is about to land the wheel strikes the ground before the load of the airplane comes onto it, and the forward movement of the airplane thus causes the wheel to roll along the runway and rotate, as indicated in Fig. 2. After this rotation has been established, the airplane settles thus bringing the top of the slot 18 into engagement with the bolt 17, as shown in Fig. 3, thereby throwing the load of the airplane onto the wheel 20 which is already rotating, and as the airplane continues to settle the yielding resistance comes into play, providing an effective cushioning device between the rotating wheel and the airplane.

It results from the construction described that a great deal of wear and tear on the landing wheel is saved over the usual system wherein the wheels without rotation suddenly engage the ground with the weight of the airplane applied thereon, which necessarily causes a destructive abrasion of the wheel. This destructive abrasion has been very troublesome in the past and to avoid it it has been proposed to equip the airplane with a motor geared with the wheels to start them rotating before they come in contact with the ground. Such systems are cumbersome and expensive and liable to get out of order, whereas my system of giving a rotation to the wheel is very simple, inexpensive and reliable.

I claim:

1. In an airplane landing gear, the combination of a shock absorbing cylinder and plunger, one member of which is rigid with the airplane and the other member movable with reference thereto, a lever pivotally carried by the airplane having an up-and-down loose-play connection with the movable member of the shock absorber, and a landing wheel carried by the lever.

2. In a landing gear, the combination of a shock absorber having a cylinder and plunger, a supporting bracket carried by the airplane, a lever pivoted to the bracket, a connection between the lever and plunger comprising a pin on one of them accupying an up-and-down slot on the other, and a landing wheel carried by the lever.

3. In a landing gear, the combination of a shock absorber having a cylinder and plunger, a supporting bracket carried by the airplane, a lever pivoted to the bracket and connected to the plunger, and a landing wheel carried by the lever, said lever comprising an upper chord member bifurcated at opposite ends to pass respectively on the opposite sides of the plunger and onto opposite sides of the landing wheel, and a pair of truss rods connected at its ends to the lever adjacent its opposite ends and intermediately spaced by struts from the bifurcated lever.

LUCIEN R. GRUSS.

REFERENCES CITED

The following references are of record in the file of this patent:

UNITED STATES PATENTS

| Number | Name | Date |
| --- | --- | --- |
| 1,653,361 | Krammer | Dec. 20, 1927 |
| 1,845,345 | Sauzedde | Feb. 16, 1932 |
| 2,021,306 | Hathorn | Nov. 19, 1935 |
| 2,039,135 | Waugh | Apr. 28, 1936 |
| 2,279,447 | Cowey | Apr. 14, 1942 |

FOREIGN PATENTS

| Number | Country | Date |
| --- | --- | --- |
| 429,936 | France | July 29, 1911 |
| 532,599 | Germany | Aug. 31, 1930 |
| 726,550 | France | Mar. 7, 1932 |